(12) United States Patent
Tseng et al.

(10) Patent No.: US 6,678,756 B1
(45) Date of Patent: Jan. 13, 2004

(54) METHOD FOR CONTROLLING A FIRST-IN-FIRST-OUT ARRAY TO FACILITATE DATA TRANSMISSIONS BETWEEN A LOWER FREQUENCY DOMAIN AND A HIGHER FREQUENCY DOMAIN OF A COMPUTER SYSTEM

(75) Inventors: Chung-Jui Tseng, Taipei (TW); Tse-Hsien Wang, Taoyuan (TW)

(73) Assignee: Via Technologies, Inc., Taipei (TW)

( * ) Notice: Subject to any disclaimer, the term of this patent is extended or adjusted under 35 U.S.C. 154(b) by 526 days.

(21) Appl. No.: 09/628,794

(22) Filed: Jul. 28, 2000

(30) Foreign Application Priority Data

Sep. 10, 1999 (TW) .......................................... 8115691 A

(51) Int. Cl.$^7$ ................................................ G06F 3/00
(52) U.S. Cl. .......................... 710/52; 710/29; 710/53; 710/56; 710/60; 710/58
(58) Field of Search ........................... 710/29, 52, 53, 710/56, 60, 58

(56) References Cited

U.S. PATENT DOCUMENTS

| | | | | |
|---|---|---|---|---|
| 4,407,016 A | * | 9/1983 | Bayliss et al. .................. 710/3 |
| 4,864,543 A | * | 9/1989 | Ward et al. .................. 365/221 |
| 4,875,196 A | * | 10/1989 | Spaderna et al. ............ 365/238 |
| 4,891,788 A | * | 1/1990 | Kreifels ........................ 365/49 |
| 5,502,655 A | * | 3/1996 | McClure ...................... 702/127 |
| 5,506,809 A | * | 4/1996 | Csoppenszky et al. ....... 365/221 |
| 5,642,318 A | * | 6/1997 | Knaack et al. .............. 365/201 |
| 5,758,075 A | * | 5/1998 | Graziano et al. ............ 709/250 |
| 5,848,295 A | * | 12/1998 | Anderson et al. .............. 710/7 |
| 6,044,416 A | * | 3/2000 | Hasan .......................... 710/52 |
| 6,304,936 B1 | * | 10/2001 | Sherlock ..................... 710/305 |
| 6,353,864 B1 | * | 3/2002 | Yamamoto .................... 710/56 |
| 6,516,362 B1 | * | 2/2003 | Magro et al. ................. 710/58 |

* cited by examiner

Primary Examiner—Kim Huynh
Assistant Examiner—Niketa Patel
(74) Attorney, Agent, or Firm—Rabin & Berdo, P.C.

(57) ABSTRACT

A method for controlling a FIFO array. The method uses a write pointer to indicate a write address, a read pointer to indicate a read address, a flag to indicate the status of the write pointer and the read pointer, and a number of status parameters to indicate the status of the FIFO array. The FIFO array has M addresses, and a first address is one of the M addresses. When both the write pointer and the read pointer point to the first address of the FIFO array and a write data operation is performed, the flag is a first value and the write pointer points to the next address following the first address of the FIFO array. When both the read pointer and the write pointer point to the first address of the FIFO array and a read data operation is performed, the flag is a second value and the read pointer points to the next address following the first address of the FIFO array. Finally, status parameters are set. By these, the FIFO array is easily and effective controlled in various situations.

32 Claims, 10 Drawing Sheets

METHOD FOR CONTROLLING A FIRST-IN-FIRST-OUT ARRAY TO FACILITATE DATA TRANSMISSIONS BETWEEN A LOWER FREQUENCY DOMAIN AND A HIGHER FREQUENCY DOMAIN OF A COMPUTER SYSTEM

BACKGROUND OF THE INVENTION

This application incorporates by reference Taiwanese application Serial No. 088115691, Filed Sep. 10, 1999.

1. Field of Invention

The present invention relates to a FIFO (first in first out) controlling method. More particularly, the present invention relates to a controlling method of a FIFO array used for transmitting signals between different devices.

2. Description of Related Art

FIG. 1 schematically illustrates a system block diagram of a conventional computer. In general, a central process unit (CPU) is connected to a north bridge chipset (NB) 104, and the NB 104 is further connected to memory 106 and a peripheral component interconnect (PCI) bus 108. The PCI bus 108 is then connected to a south bridge chipset (SB) having integrated disk electronics (IDE) interfaces 112 through which the SB can connect to IDE compatible devices, such as a hard disk 114.

Data transmission between various devices are usually controlled by PCI bus 108, IDE interface 112, south bridge chipset 110 and north bridge chipset 104. Taking data transmission between a memory 106 and a hard disk 114 as an example, when data are transferred from the hard disk 114 to the memory 106, a message must send to the memory 106 through the IDE interface 112, south bridge 110, PCI bus, and north bridge 104. The hard disk 114 must acknowledge to the memory 106 that data will be transferred and then waits a response from the memory 106. After the memory 106 responds to the request from the hard disk 114, the hard disk 114 begins to transfer data to the memory 106. When the hard disk 114 finishes the data transfer, the hard disk 114 has to send a stop signal to the memory 106 to acknowledge to the memory 106 that the data transfer is stopped, and waits a response from the memory 106.

Accordingly, the hard disk 114 has to wait for responses from the memory 106 before proceeding to the next tasks. Therefore, the hard disk 114 wastes much time to wait for the responses of the memory 106, which causes the time for signal transmission to be longer and the latency becomes longer. In order to transmit data effectively, a method for controlling a first in first out (FIFO) array is necessary.

According to the definition of a FIFO array, data prepared to transfer are first stored into a FIFO array composed of registers and data are read from the FIFO array according to the sequence of data written into the FIFO array. Therefore, the device for sending data can send data to the FIFO array first without waiting responses from the device of receiving the data. A FIFO controller controls the data-read/data-write operation. Therefore, the efficiency of transferring data and signals increases.

There are several methods for controlling a FIFO array. For example, the first method utilizes only a write pointer and a read pointer to indicate the status of the FIFO array. The second method just detects whether errors have occurred in the FIFO array but cannot determine whether the FIFO array is full or empty.

Although the two methods mentioned above can control the FIFO array, they can not use the write and read pointers effectively to indicate the status of the FIFO array. Therefore, the FIFO array can not be controlled effectively.

SUMMARY OF THE INVENTION

It is an objective to provide a method for controlling a FIFO array to facilitate data transmissions between a lower frequency domain and a higher frequency domain of a computer system. In addition to the write and read pointers, the method uses a flag to control the FIFO array. Moreover, a variety of status parameters are used for indicating the status of the FIFO array. By them, the FIFO array is easily and effective controlled for various situations.

As embodied and broadly described herein, the invention provides a method for controlling a FIFO array. The method uses a write pointer to indicate a write address, a read pointer to indicate a read address, a flag to indicate the status of the write pointer and the read pointer, and a number of status parameters to indicate the status of the FIFO array. The FIFO array comprises M addresses. (a) A determination is made as to whether a write data operation is performed; if so, pointing the write pointer points to the next address from the write address which the write pointer pointed to previously and then proceeding to step (c); otherwise, it proceeds to step (c). (b). A determination is made as to whether a read data operation is performed, if so, pointing the read pointer to the next address from the read address which the read pointer pointed to previously and then proceeding to step (c); otherwise, proceeding to step (c). (c). The status parameters are set corresponding to the status of the FIFO array currently.

In addition, the flag is set to a first value indicative of overflow of the FIFO array when the write pointer points to a maximum address of the FIFO array, the flag is set to a second value indicative of non-overflow of the FIFO array when the read pointer points to the maximum address of the FIFO array; and the FIFO array is controlled according to the read pointer the write pointers, the flag and the status parameters.

The write operation is performed when a first control signal of the lower frequency domain is received to indicate that a first data signal from the first device is pushed into the FIFO array.

The read operation is performed in response to the first control signal to generate a first output signal of the higher frequency domain according to the first control signal and phase signals of the higher frequency domain, as so to transfer the first data signal to the second device.

The write operation is performed when a second control signal of the higher frequency domain is received to indicate that a second data signal from the second device is pushed into the FIFO array; and The read operation is performed in response to the second control signal to generate a second output signal of the lower frequency domain according to the second control signal and phase signals of the higher frequency domain, as so to transfer the second data signal to the first device.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

According to one preferred embodiment of the present invention, a computer can utilize a memory block having a fixed size to form an array. Therefore, a FIFO control scheme is achieved by a circular queue using the array, and the array forms a FIFO array.

The basic operation for controlling a FIFO array comprises a push operation and pop operation. The push operation means that data are written into FIFO array, while the pop operation means that data are read from the FIFO array. A write pointer WP and read pointer RP record an address where data can be written into the FIFO array and an address where data can be read from the FIFO array, respectively. The write pointer WP points to a write address where the data can be written, and the read pointer RP points to a read address where the data can be read. The write pointer WP plus 1 means that the write pointer WP points to the next address of the write address, and the read pointer RP plus 1 means that the read pointer RP points to the next address of the read address.

Figure 1:
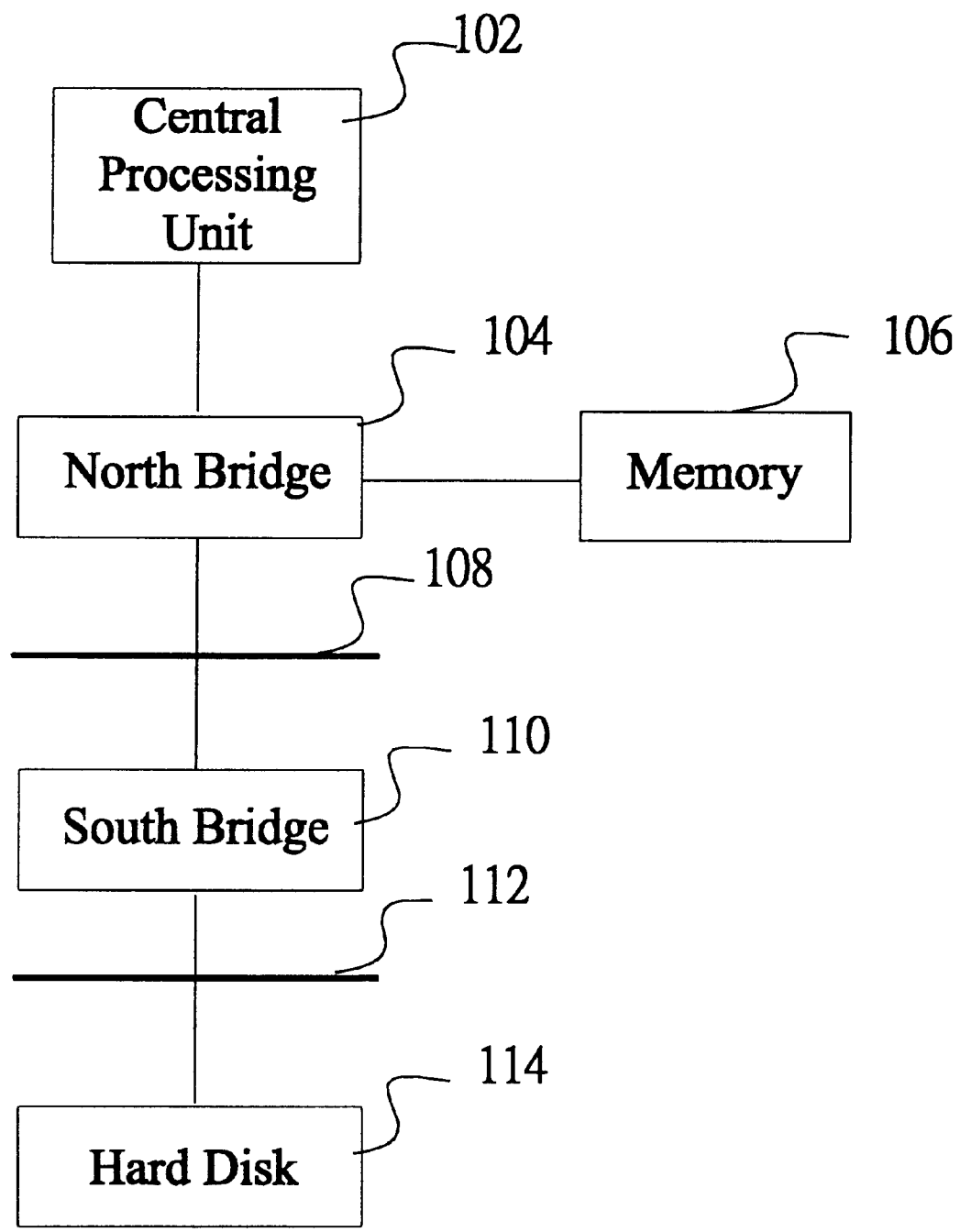
FIG. 1 is a block diagram of a conventional computer system.
Figure 2:
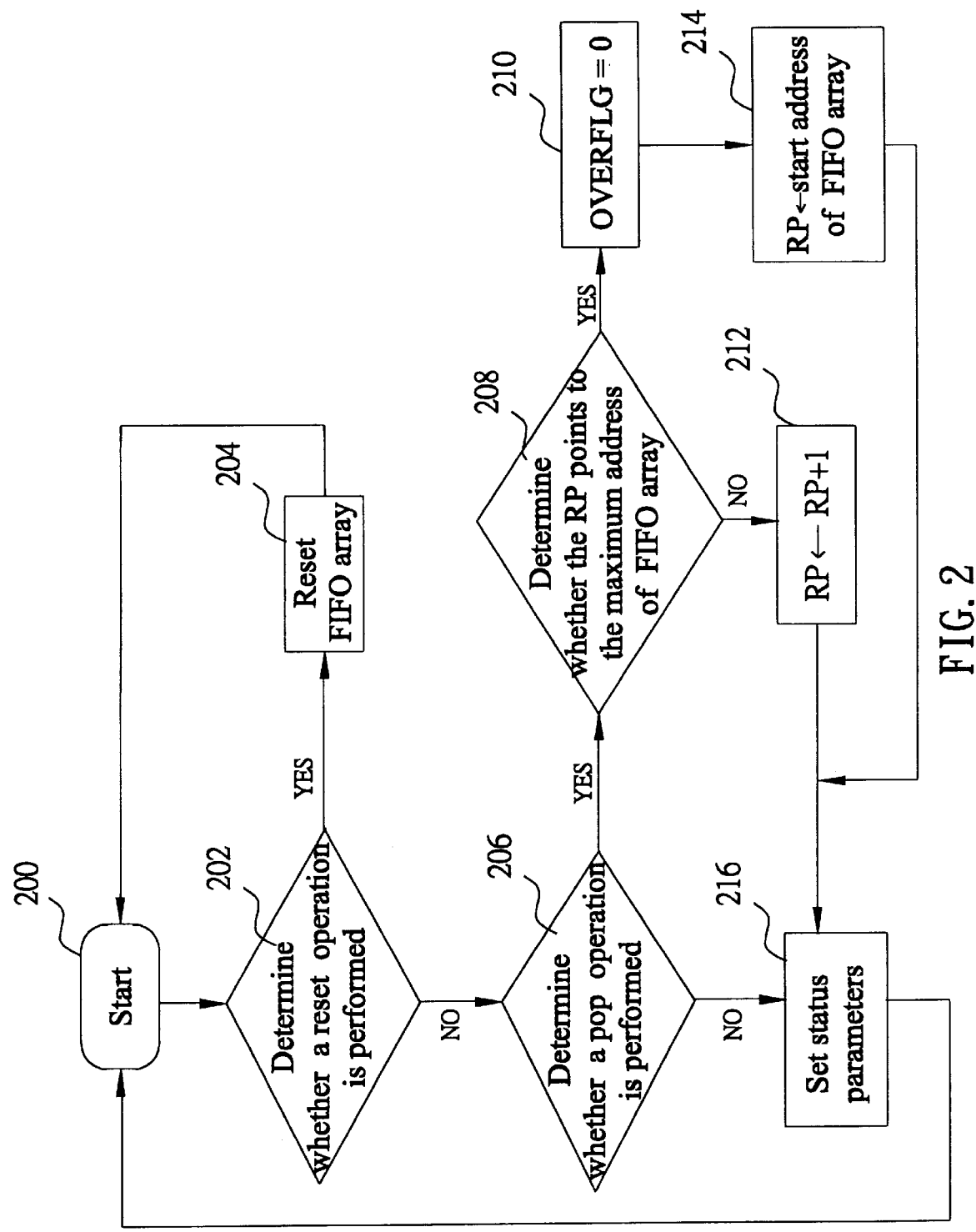
FIG. 2 is a flow chart of a pop operation according to one preferred embodiment of the invention.

FIG. 2 illustrates a schematic flow chart according to the preferred embodiment of the present invention. Referring to FIG. 2, at step 200, the process for controlling the FIFO array of the present invention is initiated. At step 202, whether performing a reset operation is determined. If a reset operation is to be performed, then the FIFO array is reset and the step 200 is repeated, otherwise step 206 is performed to determine whether a pop operation is to be performed.

At step 204, the reset operation comprises pointing the read pointer RP to a start address of the FIFO array, setting an overflow flag OVERFLG to logic 0 and setting status parameters used for determining the status of the FIFO array to logic 0. The status parameters include full parameter FULL, half-full parameter HFULL, left-2 full parameter L2FULL and left-4 full parameter L4FULL. After resetting the FIFO array, the step 200 is repeated.

In the step 206, if a pop operation has to be performed, then the step 208 follows to determine whether the read pointer RP points to the maximum address of the FIFO array. If the read pointer RP points to the maximum address of the FIFO array, then step 210 follows, otherwise the step 212 follows. At step 210, a pop operation is performed and then the overflow flag OVERFLG is logic 0. After step 210 is performed, the read pointer RP is redirected to the start address of the FIFO array at step 214. At step 212, the pop operation is performed and 1 is added to the value of the read pointer RP.

If there is no pop operation to be performed at step 206, then step 216 follows to determine the status of the FIFO array and the status parameters of the FIFO array is set. When step 212 is finished, step 216 is performed to set status parameters of the FIFO array. According to the status of the FIFO array, the full parameter FULL, half-full parameter HFULL, left-2 full parameter L2FULL and left-4 full parameter L4FULL are set and the step 200 is repeated.

Figure 3:
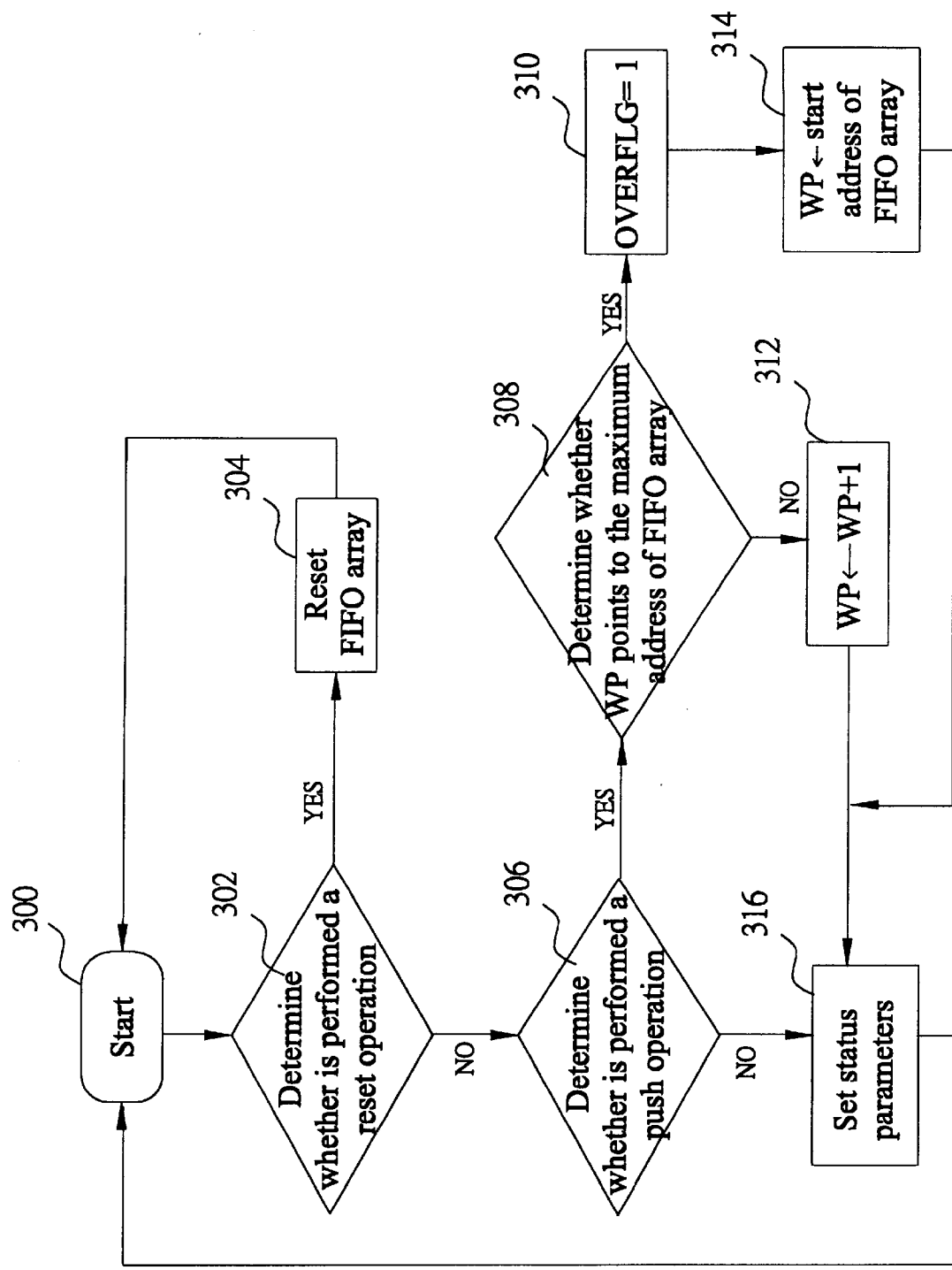
FIG. 3 is a flow chart of a push operation according to one preferred embodiment of the invention.

FIG. 3 shows a flow chart of a push operation of a FIFO array according to the present invention. At step 300 the push operation of the FIFO array is initiated. If a reset operation is to be performed, then the FIFO array is reset and the step 300 is repeated, otherwise step 306 is performed to determine whether a push operation is to be performed.

At step 304, the reset operation comprises pointing the write pointer WP to the start address of the FIFO array, and setting three status parameters used for determining the status of the FIFO array to a value of logic 1. The three status parameters are empty parameter EMPTY, parameter HEMPTY, and left-2 empty parameter L2EMPTY. After resetting the FIFO array, the method repeats the start step 300.

At step 306, if the push operation is to be performed, step 308 follows to determine whether the write pointer WP points to the maximum address of the FIFO array. If so, then the method proceeds step 310. Otherwise, the method proceeds step 312. At step 310, a push operation is performed, and then the overflow flag OVERFLG is logic 1. After step 310, the write pointer WP is redirected to the start address of the FIFO array at step 314 and then step 316 follows. At step 312, the push operation is performed and then 1 is added to the value of the write pointer WP. After step 312, the methods proceeds step 316.

If no push operation is to be performed at step 306, then the method proceeds step 316 to determine status of the FIFO array and empty parameter EMPTY, half-empty parameter HEMPTY, and left-2 empty parameter L2EMPTY of the FIFO array are set. When step 312 is finished, step 316 is performed to set status parameters of the FIFO array, and the method proceeds start step 300.

FIGS. 4A–4H schematically show the method for controlling a FIFO array according to the preferred embodiment of the present invention, showing a relationship between the write pointer WP, read pointer RP and overflow flag OVER-FLG. The values of the write pointers WP and read pointer RP point to addresses of the FIFO array, shown by arrows. The FIFO array comprises M addresses (such as 0~M−1), and data are stored in slash-line blocks.

When the write pointer WP points to the maximum address M−1 of the FIFO and data are written into the FIFO, the overflow flag OVERFLG changes from logic 0 to logic 1. In contrast, when the read pointer RP points to the maximum address M−1 of the FIFO and data are written into the FIFO, the overflow flag OVERFLG changes from logic 1 to logic 0.

Figure 4A:
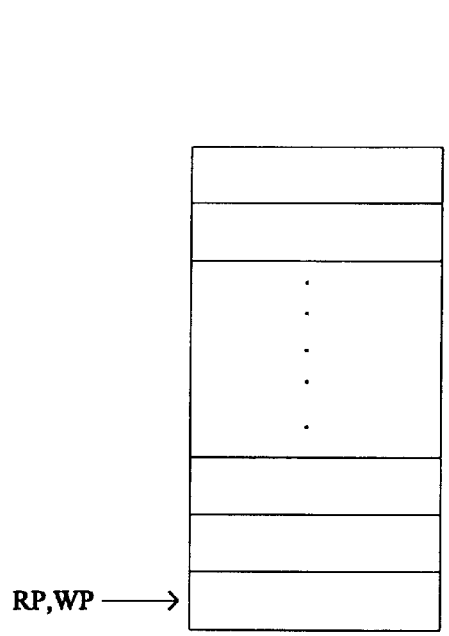
FIGS. 4A–4H schematically show the method for controlling a FIFO array according to the preferred embodiment of the present invention.
Figure 4B:
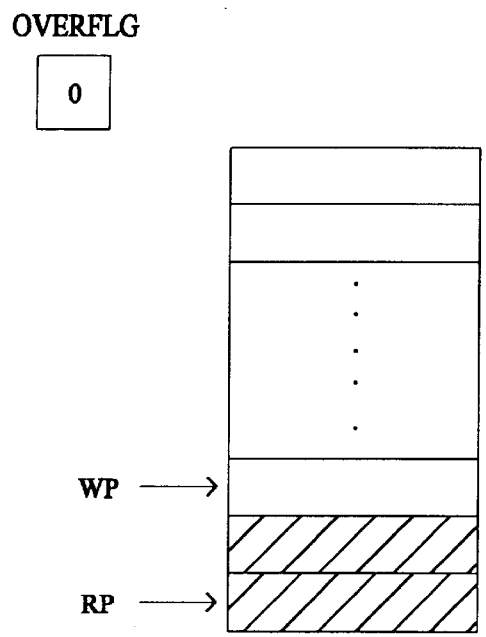
Figure 4C:
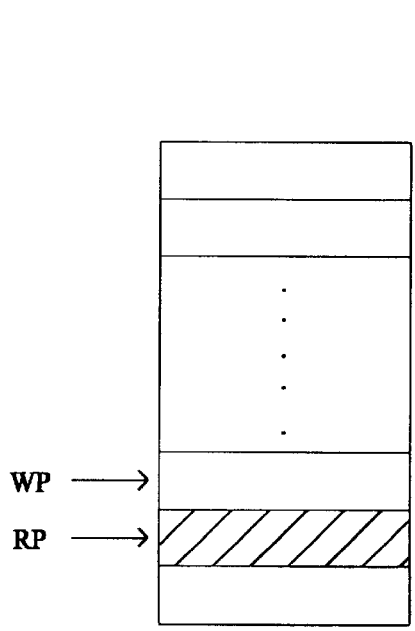

FIG. 4A schematically shows an initial status of the FIFO array, in which the FIFO array is entirely empty. The write pointer WP and the read pointer RP simultaneously point to the start address 0 of the FIFO array and the overflow flag OVERFLG is logic 0. Referring to FIG. 4B, two push operations are performed which means data are written into the FIFO array from the start address 0 to the address 1. The write pointer WP moves twice and points to address 2 into which the next data are written. FIG. 4C shows a pop operation for reading data is performed. The data are read from the start address 0 according to the definition of first in first out (FIFO). After the data are read, the read pointer RP moves once, and points to address 1 from which the next data are read. Meanwhile, the overflow flag OVERFLG remains logic 0.

Figure 4D:
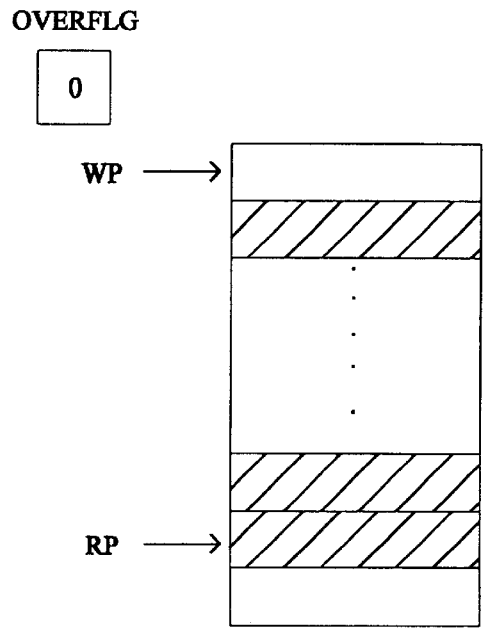
Figure 4E:
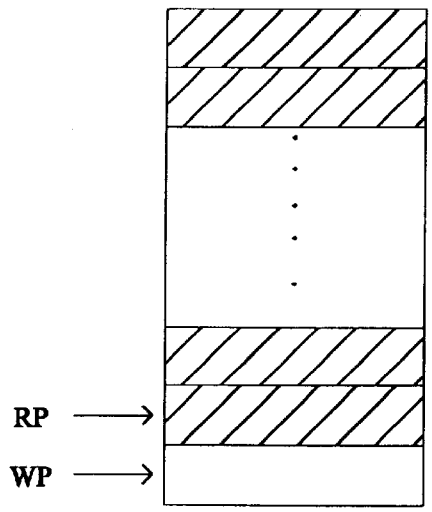
Figure 4F:
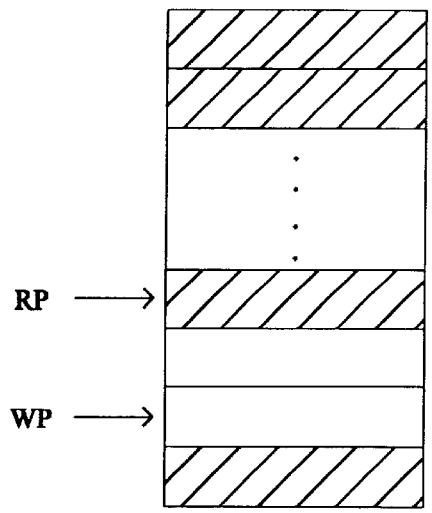
Figure 4G:
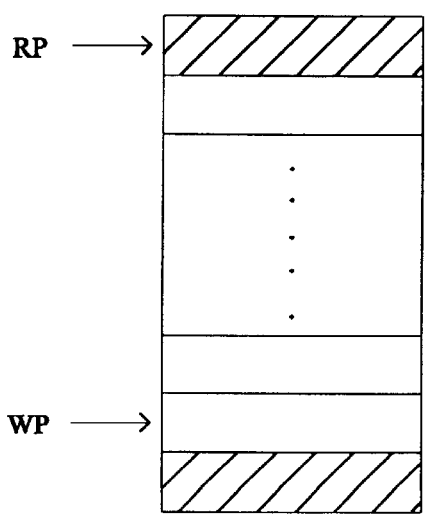
Figure 4H:
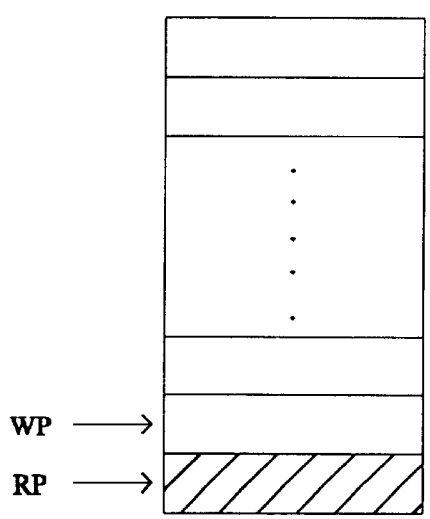

FIG. 4D shows a result that the push operation is continuously performed and then the write pointer WP points to the maximum address M−1 of the FIFO array. As shown in FIG. 4E, after one more push operation is done the overflow flag OVERFLG changes from logic 0 to logic 1. The write pointer WP points to the start address 0 again. Namely, the FIFO can be used repeatedly, which is a feature of a circular queue. FIG. 4F shows a result that one push operation and two pop operations are executed. FIG. 4G shows the read pointer RP points to the maximum address M−1 of the FIFO array after several pop operations are executed. FIG. 4H shows a result that one more pop operation is executed after the result shown in FIG. 4G. At this time, if no pop operation is to be executed and the write pointer WP does not point to the maximum address M−1 of the FIFO array, the overflow flag OVERFLG changes from logic 1 to logic 0 and the read pointer RP points to the start address 0 of the FIFO array again.

Therefore, when the write pointer WP goes through the maximum address of the FIFO array, the overflow flag OVERFLG changes to logic 1. When the read pointer RP goes through the maximum address of the FIFO array, the overflow flag OVERFLG changes to logic 0.

Figure 5A:
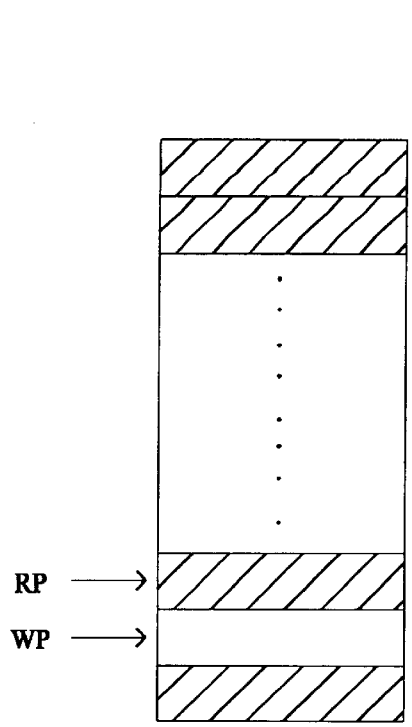
FIGS. 5A–5J illustrate the conditions of the FIFO array corresponding to the status parameters according to the preferred embodiment of the present invention.
Figure 5B:
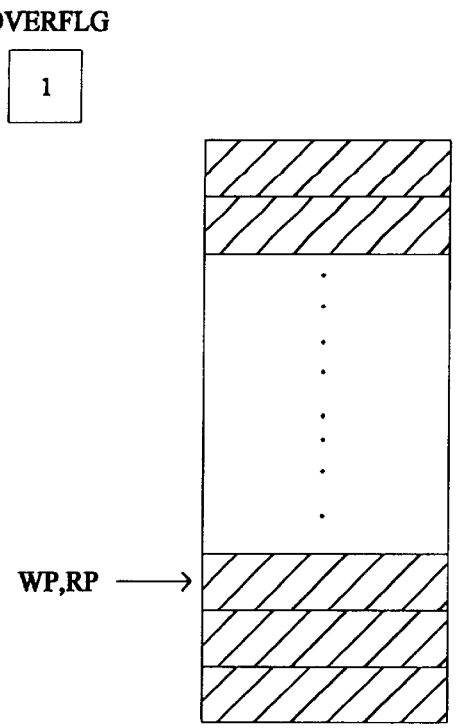
Figure 5C:
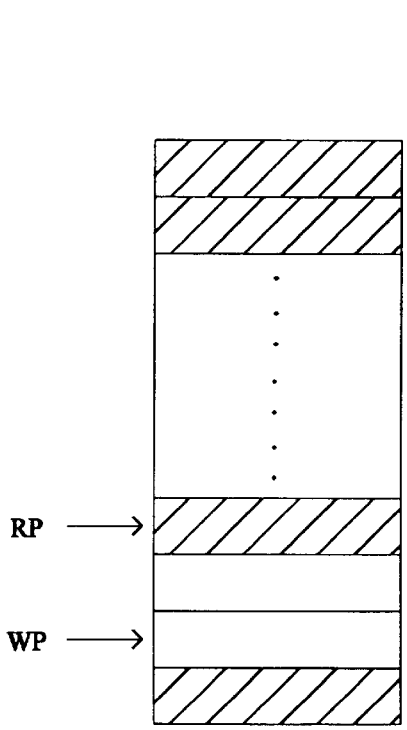

FIGS. 5A~5J are used for illustrating the conditions of the FIFO array corresponding to the status parameters according to the preferred embodiment of the present invention. FIGS. 5A and 5B are used for explaining a method of determining the full parameter FULL. FIG. 5A shows a full status but one data of the FIFO array, while FIG. 5B shows an entirely full FIFO array. When the write pointer WP and the read pointer RP point to the same address and the overflow flag OVERFLG is logic 1, the FIFO array is full and the full parameter FULL is logic 1, otherwise the full parameter FULL is logic 0. FIG. 5C shows a situation for explaining the left-2 full parameter L2FULL used for indicating whether the FIFO array is full if two more data are written into the FIFO array. When the value of the write pointer WP plus 2 equal the value of the read pointer RP and the overflow flag OVERFLG equal logic 1, the left-2 full parameter L2FULL is logic 1, otherwise the left-2 full parameter L2FULL is logic 0.

Figure 5D:
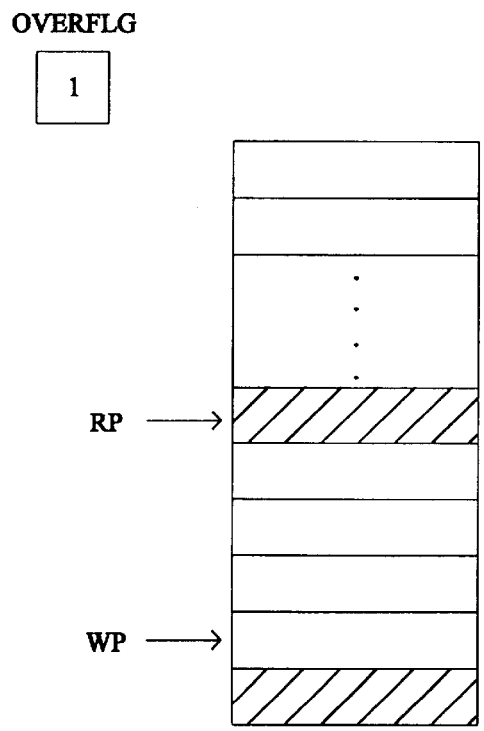

FIG. 5D shows a situation for explaining the left-4 full parameter L4FULL. The left-4 full parameter L4FULL is used for indicating whether the FIFO array is full but four data. When the value of the writing pointer WP plus 4 equals the value of the read pointer RP and the overflow flag OVERFLG equals logic 1, the left-4 full parameter L4FULL is logic 1, otherwise the left-4 full parameter L4FULL is logic 0. The reasons for determining whether the FIFO array is full by adding 2 or 4 data are that it is easy to calculate adding 2 or 4 in a binary system.

Figure 5E:
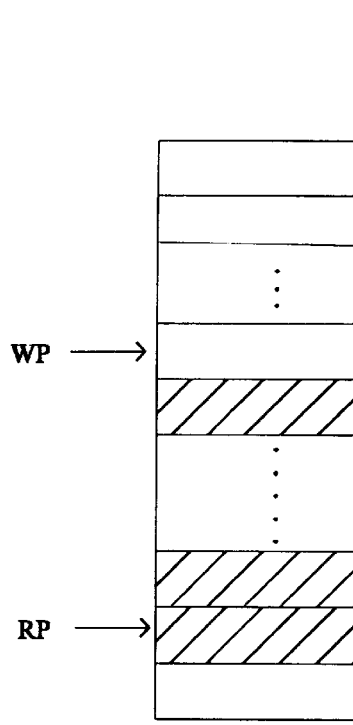
Figure 5F:
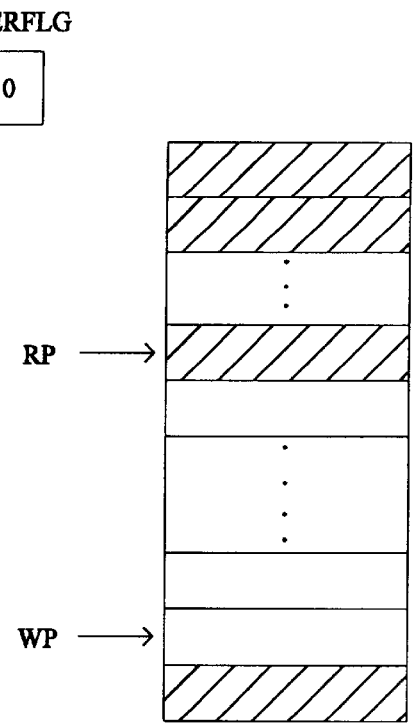

FIGS. 5E and 5F shows a situation for explaining the half-full parameter HFULL. The half-full parameter HFULL is used for indicating whether the FIFO array is half full. There are two situations for a half full FIFO array, as shown in FIG. 5E for OVERFLG equal to logic 0 and in FIG. 5F for OVERFLG equal to 1. Referring to FIG. 5E, when the overflow flag OVERFLG equals logic 0 and the value of the pointer RP plus M/2 is less than the value of the write pointer WP, the half-full parameter HFULL is then logic 1. Otherwise, the half-full parameter HFULL is logic 0. Referring to FIG. 5F, the half-full parameter HFULL is logic 1, if both the overflow flag OVERFLG equals logic 1 and the following relation is satisfied:

(the value of the write pointer WP)+(the value of the maximum address of the FIFO)−(the value of the read pointer RP)>M/2.

Otherwise, the overflow flag OVERFLG is logic 0.

Figure 5G:
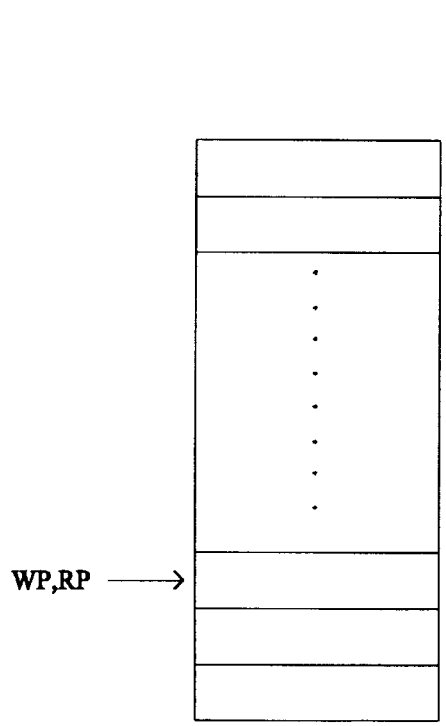
Figure 5H:
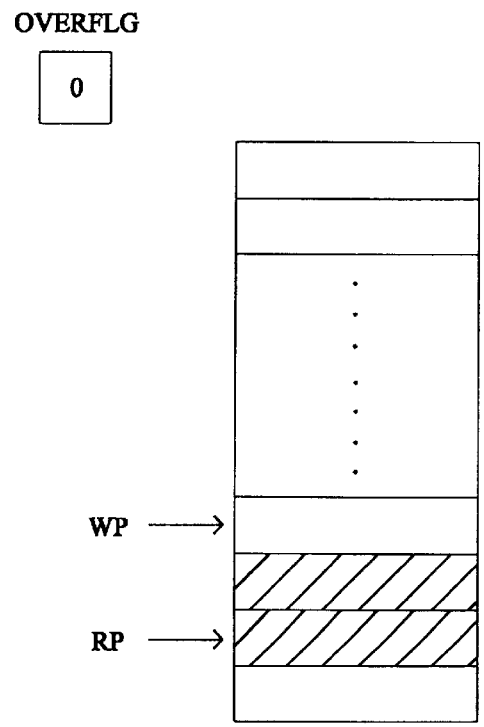
Figure 5J:
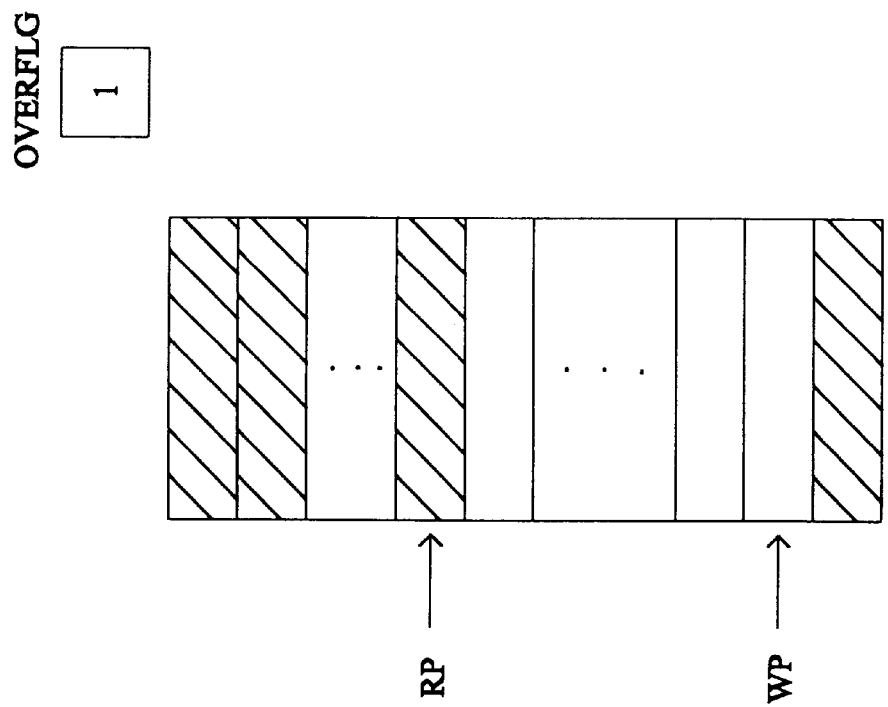
Figure 5I:
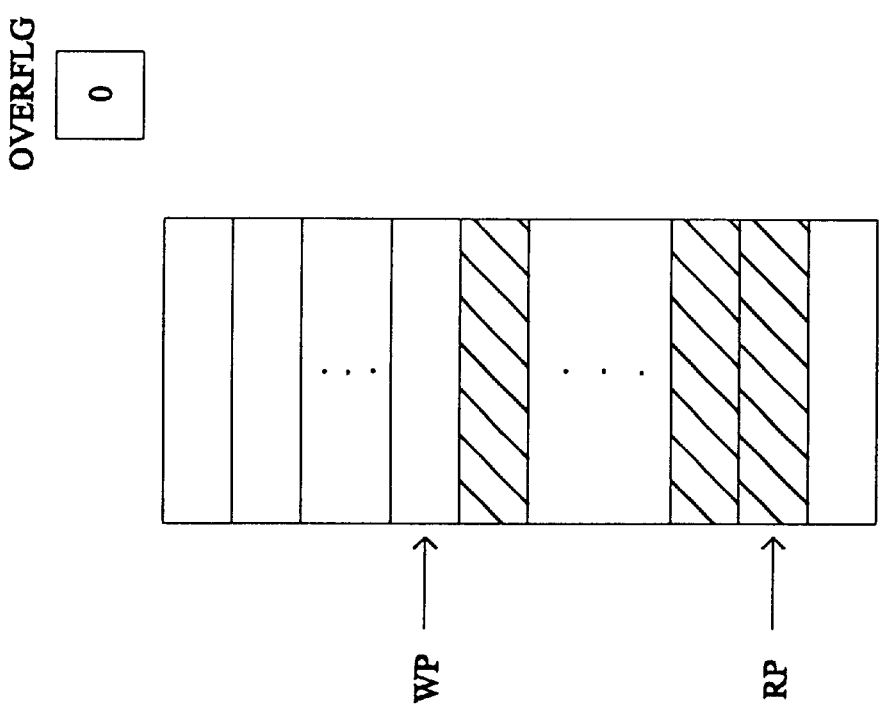

Referring to FIG. 5G, when both the write pointer WP and the read pointer RP point to the same address and the overflow flag OVERFLG is logic 0, the FIFO array is empty and the empty parameter EMPTY is logic 1, otherwise the empty parameter EMPTY is logic 0. FIG. 5H shows a situation for explaining the left-2 empty parameter L2EMPTY used for indicating whether the FIFO array is empty. If the value of the read pointer RP plus 2 is large or equal to the pointer WP and the overflow flag OVERFLG equals logic 0, the left-2 empty parameter L2EMPTY is logic 1, otherwise the left-2 empty parameter L2EMPTY is logic 0. FIGS. 5I and 5J shows a situation for explaining the half-empty parameter HEMPTY. The half-empty parameter HEMPTY is used for indicating whether the FIFO array is half empty. There are two situations for a half empty FIFO array, as shown in FIG. 5I for overflow flag OVERFLG equal to logic 0 and in FIG. 5J for overflow flag OVERFLG equal to logic 1. Referring to FIG. 5I, when the overflow flag OVERFLG equal logic 0 and the value of the read pointer RP plus M/2 is larger than the write pointer WP, the half-empty parameter HEMPTY is logic 1, otherwise logic 0. Referring to FIG. 5J, the half-empty parameter HEMPTY is logic 1 when both the overflow flag OVERFLG is logic 1 and the following relation is satisfied:

(the value of the maximum address)−(the value of the read pointer RP)+(the value of the write pointer WP)≦M/2.

Otherwise, the half-empty parameter HEMPTY is logic 0.

Figure 6:
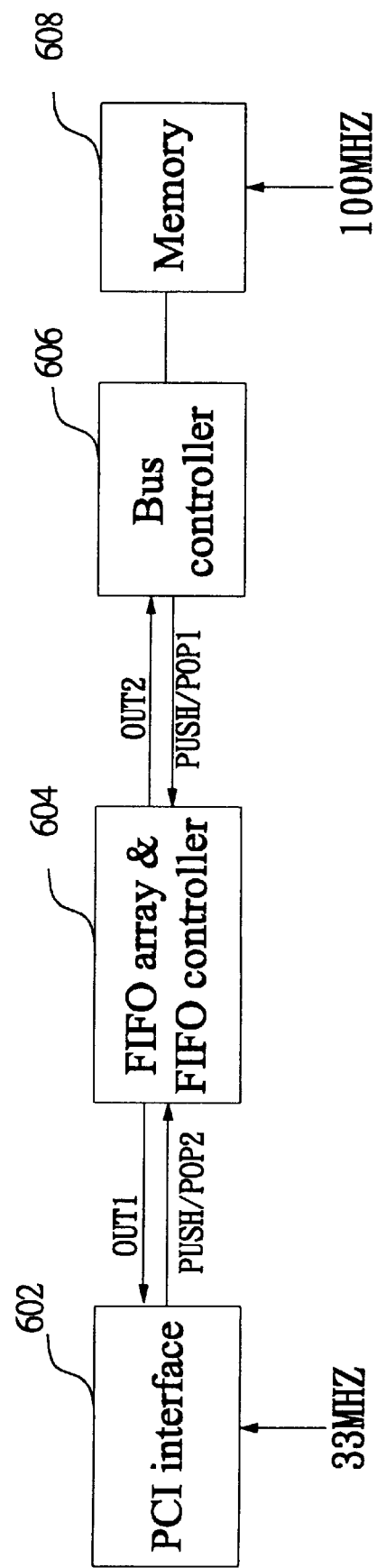
FIG. 6 is a block diagram in part within a computer system using the FIFO array and the controller of this invention.

FIG. 6 shows a block diagram in part within a computer system using the FIFO array and the controller of this invention. Referring to FIG. 6, a PCI interface 602 is connected to a FIFO array and FIFO controller 604. The FIFO array and controller 604 is then connected to a bus controller 606 and a memory 608 in turns. The input and output of the FIFO array and controller 602 are bi-direction and used for outputting status parameters. The system clock of the PCI interface 602 is 33 MHz, and the system clock of the bus controller 606 is 100 MHz. If the memory 608 transfers data signal A to the PCI interface, then the bus controller 606 inputs a push/pop signal PUSH/POP1 to the FIFO array and FIFO controller 604 to indicate that the data signal A is pushed into the FIFO array. After that, the FIFO array and FIFO controller 604 outputs an output signal OUT1 to the PCI interface 602 and transfers the data signal A to the PCI interface 602. If the PCI interface 602 transfers data signal B to the memory 608, then a push/pop signal PUSH/POP2 is input to the FIFO array and FIFO controller 604 to indicate that the data signal B is pushed into the FIFO array and FIFO controller 604. After that, the FIFO array and FIFO controller 604 outputs an output signal OUT2 to the bus controller 606 and transfers the data signal B to the bus controller 606 and the memory 608.

Figure 7:
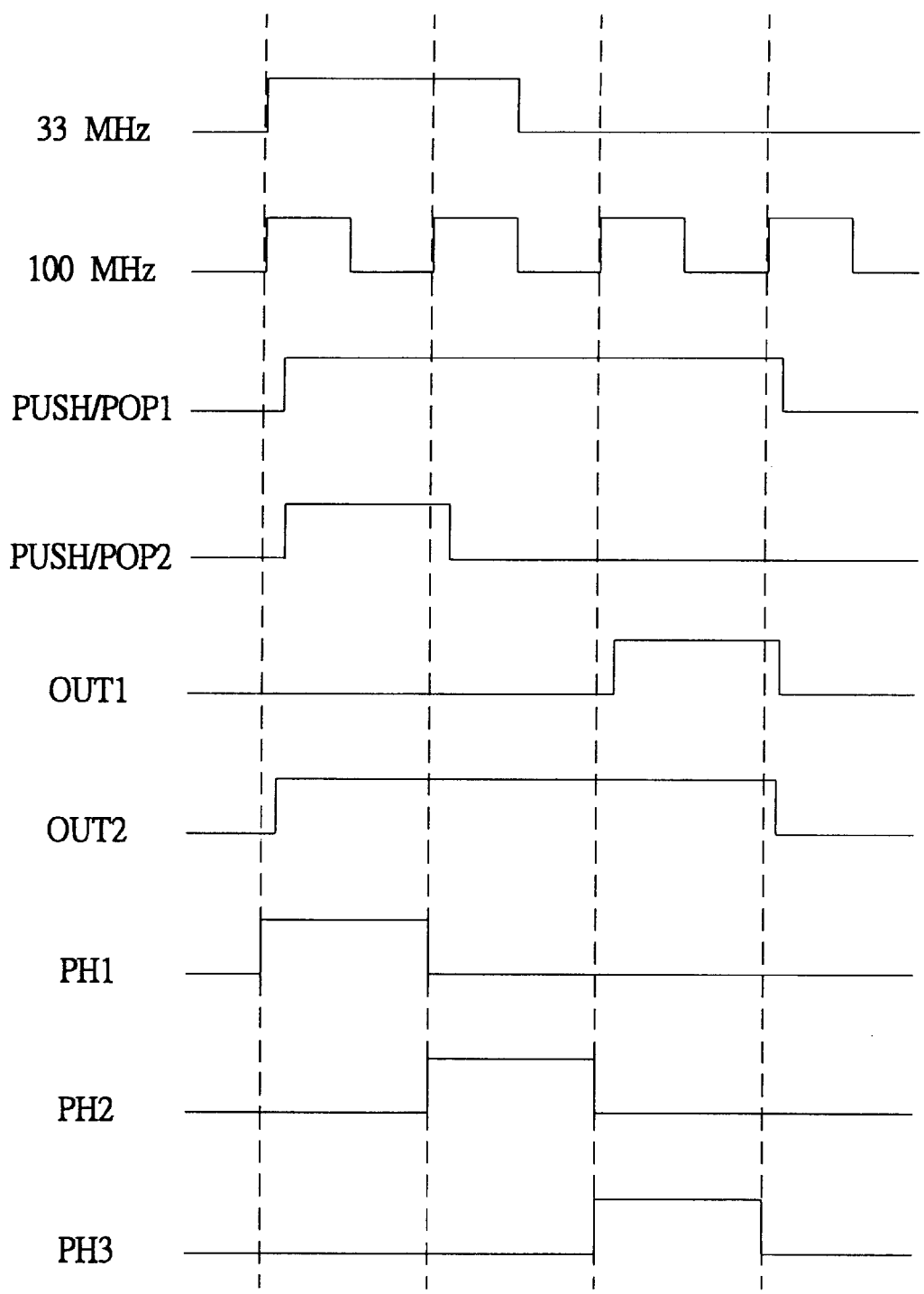
FIG. 7 is a timing diagram of the corresponding signals shown in FIG. 6.

FIG. 7 is a timing diagram of the corresponding signals shown in FIG. 6. A data flow is transferred from a first device having a first frequency domain to a second device having a second frequency domain, for example, from the PCI interface 602 of 33 MHz to the bus controller 608 (see FIG. 6) of 100 MHz. Therefore, one cycle time of the first frequency domain equal three cycle times of the second frequency domain. Namely, with respect to the first frequency domain, the second frequency domain comprises three phase signals PH1, PH2, and PH3. The three phase signals PH1, PH2, and PH3 alternately emerge to serve as an effective signal. The effective signal emerges and remains one of the cycle times within the second frequency domain. A high level of the phase signals PH1, PH2, and PH3 is used for an enabling signal, which is an example shown in FIG. 7. When a push/pop signal PUSH/POP1 of the device of 33 MHz is enabled, an output signal OUT1 is obtained by performing an "AND" operation of the phase signal PH3 and push/pop signal PUSH/POP1. Then, the output signal OUT1 is transferred to the device of 100 MHz.

Next, data transferred from the device of 100 MHz to the device of 33 MHz is described as follows. For example, the phase signal PH1 and a push/pop signal PUSH/POP2 of the device of 100 MHz perform an "AND" operation at the rising edges of the push/pop signal PUSH/POP2. The result of the "AND" operation maintains one cycle time of frequency 33 MHz and then an output signal OUT2 is transferred to the device of 33 MHz.

Accordingly, when signals are transferred between different devices, the transferring data are stored in the FIFO array under the controlling of a FIFO controller. The controlling signal and transferring data between devices having different frequency are schematically illustrated in FIG. 7. The transmission and transfer of signals between devices can be more effective by using the FIFO array and FIFO controller of the present invention.

Therefore, in addition to using an overflow flag with respect to the FIFO array, the features of the present invention are that a variety of status parameters are used for indicating the status of the FIFO array, by which a computer system can accurately control the FIFO array.

According to the preferred embodiment, an example utilizing seven status parameters is described. However, it is not necessary to use the seven status parameters at one time. For example, it can use only full parameter and empty parameter, or use only half-full parameter and half-empty parameter etc. to describe the FIFO array.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. In a computer system, a method for controlling a first-in first-out (FIFO) array to facilitate data transmissions between a first device of a lower frequency domain and a second device of a higher frequency domain, wherein the FIFO array uses a write pointer to indicate a write address, a read pointer to indicate a read address, a flag to indicate the status of the write pointer and the read pointer, and a number of status parameters to indicate the status of the FIFO array, and wherein the FIFO array has M addresses, the method comprising the steps of:

(a). determining whether a write data operation is performed; if so, pointing the write pointer to the next address from the write address which the write pointer pointed to previously and then proceeding to step (c); otherwise, proceeding to step (c);

(b). determining whether a read data operation is performed; if so, pointing the read pointer to the next address from the read address which the read pointer pointed to previously and then proceeding to step (c); otherwise, proceeding to step (c); and (c). setting the status parameters corresponding to the status of the FIFO array currently;

wherein the flag is set to a first value indicative of overflow of the FIFO array when the write pointer points to a maximum address of the FIFO array; the flag is set to a second value indicative of non-overflow of the FIFO array when the read pointer points to the maximum address of the FIFO array; and the FIFO array is controlled according to the read pointer, the write pointers, the flag and the status parameters;

wherein the write operation is performed when a first control signal of the lower frequency domain is received to indicate that a first data signal from the first device is pushed into the FIFO array;

wherein the read operation is performed in response to the first control signal to generate a first output signal of the higher frequency domain according to the first control signal and phase signals of the higher frequency domain, as so to transfer the first data signal to the second device;

wherein the write operation is performed when a second control signal of the higher frequency domain is received to indicate that a second data signal from the second device is pushed into the FIFO array; and wherein the read operation is performed in response to the second control signal to generate a second output signal of the lower frequency domain according to the second control signal and phase signals of the higher frequency domain, as so to transfer the second data signal to the first device.

2. The method of claim 1, wherein before the step (a) the method further comprises the steps of:

(a0). determining whether a reset operation is to be performed;

(a1). if a reset operation is to be performed, resetting the write pointer, the read pointer, the flag, and the status parameters and then proceeding to the step; otherwise, performing the step (a) and step (b);

wherein the method proceeds to the step (a0) after the step (c) is performed.

3. The method of claim 2, wherein the reset operation comprises the steps of:

setting the flag to second value indicative of non-overflow of the FIFO array;

pointing the write pointer and the read pointer to a start address of the FIFO array; and setting the status parameters according to the status of the FIFO array.

4. The method of claim 1, wherein the first address is a maximum address of the FIFO array.

5. The method of claim 1, wherein the second value is logic 0.

6. The method of claim 1, wherein the first value is logic 1.

7. The method of claim 1, wherein the status parameters comprise a full parameter to indicate whether the FIFO array is full and an empty parameter to indicate whether the FIFO array is empty.

8. The method of claim 7, wherein the full parameter is set to the first value when the write pointer and the read pointer have an equal value corresponding to one of the addresses of the FIFO array and the flag is of the first value.

9. The method of claim 7, wherein the empty parameter is set to the first value when the write pointer and the read pointer have an equal value corresponding to one of the addresses of the FIFO array and the flag is of the second value.

10. The method of claim 7, wherein the status parameters further comprise a half-full parameter to indicate whether the FIFO array is half full, a left-2 full parameter to indicate whether the FIFO array will be full when two more data items are written into the FIFO array, a left-4 full parameter to indicate whether the FIFO array will be full when four more data items are written into the FIFO array, a half-empty parameter to indicate whether the FIFO array is half empty, and a left-2 empty parameter to indicate whether the FIFO array will be empty when two more data items are read from the FIFO array.

11. The method of claim 10, wherein the half-full parameter is set to the first value when the flag is the second value and a value that is an address pointed to by the read pointer plus M/2 is less than a value that is an address pointed to by the write pointer.

12. The method of claim 10, wherein the half-full parameter is set to the first value when flag is the first value and the following relation is satisfied:

(a value that is an address pointed to by the write pointer)+(the value of the first address)−(a value that is an address pointed to by the read pointer)>M/2.

13. The method of claim 10, wherein the left-2 full parameter is set to the first value when the flag is the first value and a value that is an address pointed to by the read pointer is equal a value that is an address pointed to by the write pointer plus 2.

14. The method of claim 10, wherein the left-4 full parameter is set to the first value when the flag is the first value and a value that is an address pointed to by the read pointer is equal to a value that is an address pointed to by the write pointer plus 4.

15. The method of claim 10, wherein the half-empty parameter is set to the first value when the flag is the second value and a value that is an address pointed to by the write pointer is less than a value that is an address pointed to by the read pointer plus M/2.

16. The method of claim 10, wherein the half-empty parameter is set to the first value when the flag is the first value and the following relation is satisfied:

(the value of the first address)−(a value that is an address pointed to by the read pointer)+(a value that is an address pointed to by the write pointer)□ M/2.

17. The method of claim 10, wherein the left-2 empty parameter is set to the first value when the flag is the second value and a value that is an address pointed to by the write pointer is less than a value that is an address pointed to by the read pointer plus 2.

18. The method of claim 1, wherein the status parameters comprise a half-full parameter to indicate whether the FIFO array is half full, a left-2 full parameter to indicate whether the FIFO array will be full when two more data items are written into the FIFO array, a left-4 full parameter to indicate whether the FIFO array will be full when four more data items are written into the FIFO array, a half-empty parameter to indicate whether the FIFO array will be half empty and a left-2 empty parameter to indicate whether the FIFO array is empty when two more data items are read from the FIFO array.

19. The method of claim 18, wherein the half-full parameter is set to the first value when the flag is the second value and a value that is an address pointed to by the read pointer plus M/2 is less than a value that is an address pointed to by the write pointer.

20. The method of claim 18, wherein the half-full parameter is set to the first value when the flag is the first value and the following relation is satisfied:

(a value that is an address pointed to by the write pointer)+(the value of the first address)−(a value that is an address pointed to by the read pointer)>M/2.

21. The method of claim 18, wherein the left-2 full parameter is set to the first value when the flag is the first value and a value that is an address pointed to by the read pointer is equal to a value that is an address pointed to by the write pointer plus 2.

22. The method of claim 18, wherein the left-4 full parameter is set to the first value when the flag is the first value and a value that is an address pointed to by the read pointer is equal to a value that is an address pointed to by the write pointer plus 4.

23. The method of claim 18, wherein the half-empty parameter is set to the first value when the flag is the second value and a value that is an address pointed to by the write pointer is less than a value that is an address pointed to by the read pointer plus M/2.

24. The method of claim 18, wherein the half-empty parameter is set to the first value when the flag is the first value and the following relation is satisfied:

(the value of the first address)−(a value that is an address pointed to by the read pointer)+(a value that is an address pointed to by the write pointer)□ M/2.

25. The method of claim 18, wherein the left-2 empty parameter is set to the first value when the flag is the second value and a value that is an address pointed to by the write pointer is less than a value that is an address pointed to by the read pointer plus 2.

26. The method of claim 1, wherein
the lower frequency domain has a first clock frequency, the higher frequency domain has a second clock frequency, the first control signal is a first push/pop signal, and the second control signal is a second push/pop) signal, and the first output signal is generated by performing an AND operation on a first one of the phase signals and the first push/pop signal; and
the second output signal is generated by performing an AND operation of on a second one of the phase signals and the second push/pop signal at rising edges of the second push/pop signal and maintaining a result of the AND operation for a period of the first clock frequency to generate the second output signal.

27. The method of claim 26, wherein the first clock frequency is 33 MHz and the second clock frequency is 100 MHz.

28. The method of claim 26, wherein the second clock frequency is equal to N times the first clock frequency, and the phase signals have N phase signals alternately emerging with non-overlapping enabling periods.

29. The method of claim 28, wherein the first one of the phase signals corresponds to falling edges of the first control signal and the second one of the phase signals corresponds to rising edges of the second control signal.

30. A method for facilitating data transmissions between a lower frequency domain and a higher frequency domain of a computer system, wherein the lower frequency domain includes a first clock signal which is a system clock of the lower frequency domain, a first data signal to be transferred to a second device corresponding to the higher frequency domain, and a first control signal for indicating a data transmission of the first data signal; and the higher frequency domain includes a second clock signal which is a system clock of the higher frequency domain, a plurality of phase signals each of which has a period equal to the first clock signal with an enabling period, within one cycle, equal to a period of the second clock signal, a second data signal to be transferred to a first device corresponding to the lower frequency domain, and a second control signal for indicating a data transmission of the second data signal; the method comprising the steps of:

if the first data signal is to be transferred, sending the first data signal and the first control signal to a first-in first-out (FIFO) array controller between the lower frequency domain and the higher frequency domain;

in response to the first control signal, pushing the first data signal into a FIFO array of the FIFO array controller;

generating a first output signal corresponding to the higher frequency domain by performing an AND operation of a first one of the phase signals and the first control signal; and transferring the first output signal and the first data signal corresponding to the higher frequency domain to the second device; and if the second data signal is to be transferred, sending the second data signal and the second control signal to the FIFO array controller;

in response to the second control signal, pushing the second data signal into the FIFO array;

generating a second output signal corresponding to the lower frequency domain by performing an AND operation on a second one of the phase signals and the first control signal at rising edges of the second control signal, wherein a result of the AND operation maintains for a period of the first clock signal; and transferring the first data signal corresponding to the lower frequency domain to the first device;

wherein the FIFO array has M addresses, a write pointer is used to indicate a write address in the FIFO array, a read pointer is used to indicate a read address in the FIFO array, a flag is used to indicate the status of the write pointer and the read pointer, and a plurality of status parameters are used to indicate the status of the FIFO array;

wherein the FIFO array controller is operative according to at least the steps of:

(a). determining whether a write data operation is performed; if so, pointing the write pointer to the next address from the write address which the write pointer pointed to previously and then proceeding to step (c); otherwise, proceeding to the step (c);

(b). determining whether a read data operation is performed; if so, pointing the read pointer to the next address from the read address which the read pointer pointed to previously and then proceeding to step (c); otherwise, proceeding to the step (c); and (c). setting the status parameters corresponding to the status of the FIFO array currently;

wherein the flag is set to a first value indicative of overflow of the FIFO array when the write pointer points to a maximum address of the FIFO array; the flag is set to a second value indicative of non-overflow of the FIFO array when the read pointer points to the maximum address of the FIFO array; and the FIFO array is controlled according to the read pointer, the write pointers, the flag and the status parameters;

wherein in response to one of the first control signal and the second control signal, the FIFO array controller controls the FIFO array according to the read pointer, the write pointer, the flag, and the status parameters, thereby facilitating data transmissions between the first device and the second device.

31. The method of claim 30, wherein the second clock signal is equal to N times the first clock signal in frequency; the phase signals have N phase signals alternately emerging with non-overlapping enabling periods.

32. The method of claim 31, wherein the first one of the phase signals corresponds to falling edges of the first control signal and the second one of the phase signals corresponds to rising edges of the second control signal.

\* \* \* \* \*